(12) United States Patent
Homma et al.

(10) Patent No.: US 12,117,618 B2
(45) Date of Patent: Oct. 15, 2024

(54) HEAD-MOUNTED DISPLAY

(71) Applicant: Sony Interactive Entertainment Inc., Tokyo (JP)

(72) Inventors: Akira Homma, Tochigi (JP); Toru Kuronuma, Kanagawa (JP); Toshihiro Kusunoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 568 days.

(21) Appl. No.: 17/435,872

(22) PCT Filed: Mar. 19, 2019

(86) PCT No.: PCT/JP2019/011518
§ 371 (c)(1),
(2) Date: Sep. 2, 2021

(87) PCT Pub. No.: WO2020/188760
PCT Pub. Date: Sep. 24, 2020

(65) Prior Publication Data
US 2022/0146838 A1    May 12, 2022

(51) Int. Cl.
*G02B 27/01*    (2006.01)

(52) U.S. Cl.
CPC ..... *G02B 27/0176* (2013.01); *G02B 27/0172* (2013.01); *G02B 2027/0138* (2013.01)

(58) Field of Classification Search
CPC .. G02B 27/01; G02B 27/017; G02B 27/0101; G02B 27/0107; G02B 27/0132; G02B 27/0172; G02B 27/0176; G02B 27/0178; G02B 7/00; G02B 7/008; G02B 2027/0138; G02B 2027/0176; G02B 2027/0178; G06F 1/181; G06F 1/183; G06F 1/184; G06F 1/20; G06F 1/203; G06F 1/206

See application file for complete search history.

(56) References Cited

U.S. PATENT DOCUMENTS

| | | | |
|---|---|---|---|
| 9,703,103 B2 | 7/2017 | Araki | |
| 10,579,114 B1 * | 3/2020 | Mills | ........................ G06F 1/203 |
| 10,620,439 B1 * | 4/2020 | Zhang | .................. G09G 3/3603 |
| 2007/0000642 A1 | 1/2007 | Yamazaki | |
| 2017/0017085 A1 | 1/2017 | Araki | |

(Continued)

FOREIGN PATENT DOCUMENTS

| CN | 107454805 A | 12/2017 |
|---|---|---|
| CN | 206975323 U | 2/2018 |

(Continued)

OTHER PUBLICATIONS

Notice of Allowance for corresponding Application No. JP2021-506903, 2 pages, dated Apr. 11, 2023.

(Continued)

*Primary Examiner* — Sultan Chowdhury
(74) *Attorney, Agent, or Firm* — Matthew B. Dernier, Esq.

(57) ABSTRACT

A head-mounted display includes a device main body, a mounting band that supports the device main body and is mounted on a user's head, a circuit board that is disposed in the upper portion of the device main body and has a mounting surface on which one or more electronic components are mounted, and a cooling device disposed facing the mounting surface in the upper portion of the device main body.

19 Claims, 12 Drawing Sheets

(56) References Cited

U.S. PATENT DOCUMENTS

| | | | |
|---|---|---|---|
| 2017/0184863 A1 | 1/2017 | Balachandreswaran | |
| 2018/0292889 A1 | 10/2018 | Jiang | |
| 2018/0307282 A1* | 10/2018 | Allin | G02B 27/0176 |
| 2020/0110449 A1* | 4/2020 | Chang | H05K 7/20172 |
| 2021/0185855 A1* | 6/2021 | Maric | G06F 3/011 |

FOREIGN PATENT DOCUMENTS

| | | |
|---|---|---|
| CN | 108700741 A | 10/2018 |
| CN | 112099238 A | 12/2020 |
| CN | 213042193 U | 4/2021 |
| JP | 03188777 A | 8/1991 |
| JP | 07013100 A | 1/1995 |
| JP | 915527 A | 1/1997 |
| JP | 9034376 A | 2/1997 |
| JP | 11202795 A | 7/1999 |
| JP | 2005296467 A | 10/2005 |
| JP | 2007011394 A | 1/2007 |
| JP | 2007012912 A | 1/2007 |
| JP | 2018101704 A | 6/2018 |
| JP | 2018190825 A | 11/2018 |
| WO | 2015008326 A1 | 1/2015 |
| WO | 2015137165 A1 | 9/2015 |

OTHER PUBLICATIONS

International Search Report for corresponding PCT Application No. PCT/JP2019/011518, 4 pages, dated May 14, 2019.
Notice of Reasons for Refusal for corresponding JP Application No. JP2023-078015, 10 pages, dated Feb. 2, 2024.

* cited by examiner

HEAD-MOUNTED DISPLAY

TECHNICAL FIELD

The present invention relates to a head-mounted display.

BACKGROUND ART

Development of head-mounted displays that users use by mounting the head-mounted displays to their heads is progressing. As disclosed in PTL 1, a head-mounted display is provided with a device main body in which a display is incorporated, and a band that supports the device main body and surrounds a user's head.

CITATION LIST

Patent Literature

[PTL 1] U.S. Patent Application Publication No. 2018/0307282

SUMMARY

Technical Problem

Here, in head-mounted displays, together with the number of functions or performance being made to increase, power consumption is increasing. When power consumption increases, it is more likely for the temperature of an electronic component that controls various functions of the head-mounted display to rise. When the temperature of the electronic component rises excessively, there is the possibility that a malfunction may occur or operation may stop. PTL 1 discloses a head-mounted display provided with a heat pipe or a fan for suppressing the temperature of an electronic component from rising. However, in a configuration that provides a cooling device in the front portion of a device main body of a head-mounted display as disclosed in PTL 1, the center of gravity of the device main body is positioned in front, and the load applied to a user that mounts the head-mounted display increases.

One objective of the present specification is to provide a head-mounted display that suppresses the temperature of an electronic component from rising excessively and also reduces the load applied to a user.

Solution to Problem

An example of a head-mounted display proposed in the present disclosure includes a device main body, a mounting band that supports the device main body and is mounted on the head of a user, a circuit board that is disposed in the upper portion of the device main body and has a mounting surface on which one or more electronic components are mounted, and a cooling device that is disposed facing the mounting surface in the upper portion of the device main body.

By virtue of the head-mounted display described above, it is possible to suppress the temperature of the electronic components from excessively rising and reduce a load applied to the user.

DESCRIPTION OF EMBODIMENT

With reference to the drawings, description is given below regarding an embodiment of the present invention. In the following description, directions indicated by X1 and X2 in the drawings are respectively set to right and left, directions indicated by Y1 and Y2 in the drawings are respectively set to forward and backward, and directions indicated by Z1 and Z2 in the drawings are respectively set to upward and downward. Each of these directions indicates a direction seen from a user who mounts a head-mounted display 1. In addition, in the following description, the head-mounted display 1 is referred to as the HMD (Head-Mounted Display) 1.

Figure 1:
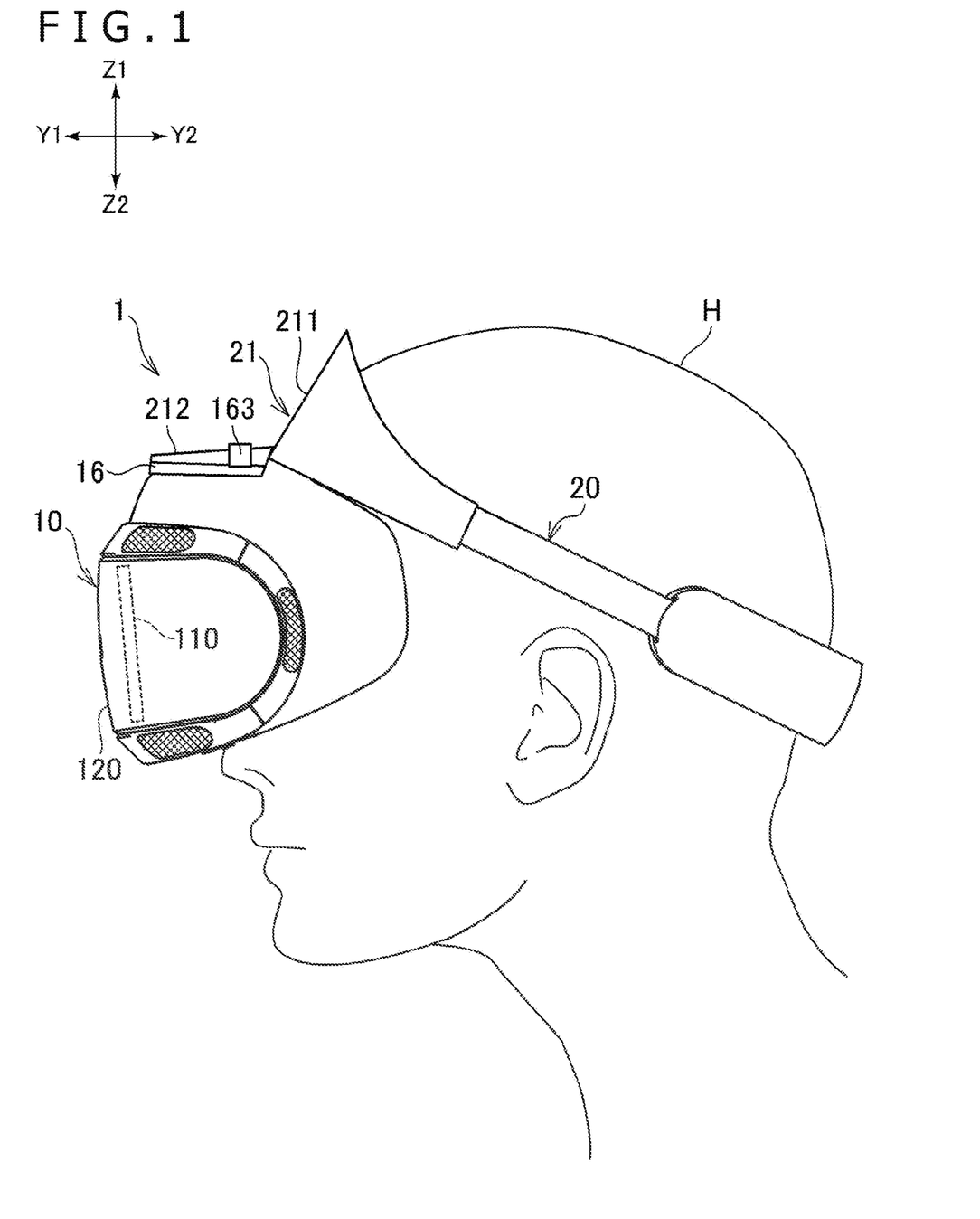
FIG. 1 is a view that illustrates a state in which an HMD according to the present embodiment is being used.

[Outline of overall configuration of HMD 1] As illustrated in FIG. 1, the HMD 1 has a device main body 10 and a mounting band 20.

As illustrated in FIG. 1, the device main body 10 has at least a display device 110, and a housing 120 that houses the display device 110 and configures the appearance of the device main body 10. The display device 110 may be a liquid crystal display device or an organic electroluminescence display device, for example, and the type thereof is not particularly limited. When the HMD 1 is being used, the device main body 10 covers the eyes of the user.

The mounting band 20 extends backward from the device main body 10. When the HMD 1 is being used, the mounting band 20 surrounds the head H of the user. It may be that the mounting band 20 is ring-shaped, and the head H is disposed therein. In an example of the HMD 1, the mounting band 20 extends diagonally backward and downward. However, there is no limit to this, and the mounting band 20 may extend horizontally.

In the example of the HMD 1, the mounting band 20 has a front member 21 in a front portion thereof. The front member 21 has a forehead contact section 211 and a support section 212.

When the HMD 1 is being used, the forehead contact section 211 of the front member 21 is made to come into contact with the front surface of the head H of the user. A cushion may be provided on the inner surface (rear surface) of the forehead contact section 211. In addition, the inner surface (rear surface) of the forehead contact section 211 may curve to fit the front surface of the head H.

The support section 212 extends forward from the lower portion of the forehead contact section 211. The support section 212 supports a supported section 16 provided in the upper portion of the device main body 10. Thus, the device main body 10 is supported by the mounting band 20 and is disposed in front of the eyes of the user who mounts the mounting band 20.

[Internal structure of device main body 100] Furthermore, with reference to FIG. 2 to FIG. 6, description is given regarding details of the internal structure of the device main body 10 in the HMD 1 according to the present embodiment. Note that, in the present embodiment, the internal structure of the device main body 10 is a portion of the device main body 10 that excludes the housing 12 illustrated in FIG. 1.

Figure 2:
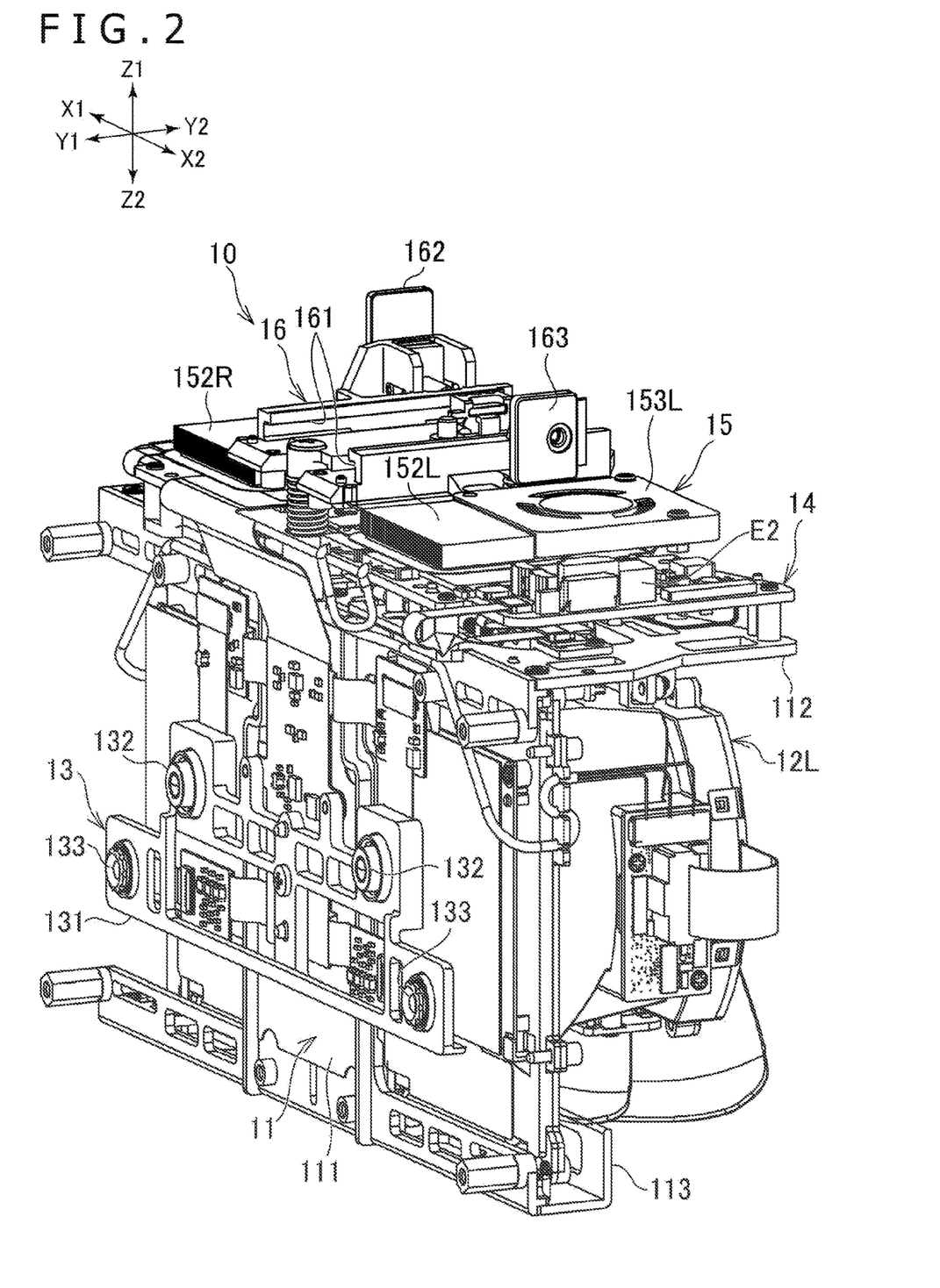
FIG. 2 is a perspective view of an internal structure of a device main body of the present embodiment, as diagonally viewed from the front left.
Figure 3:
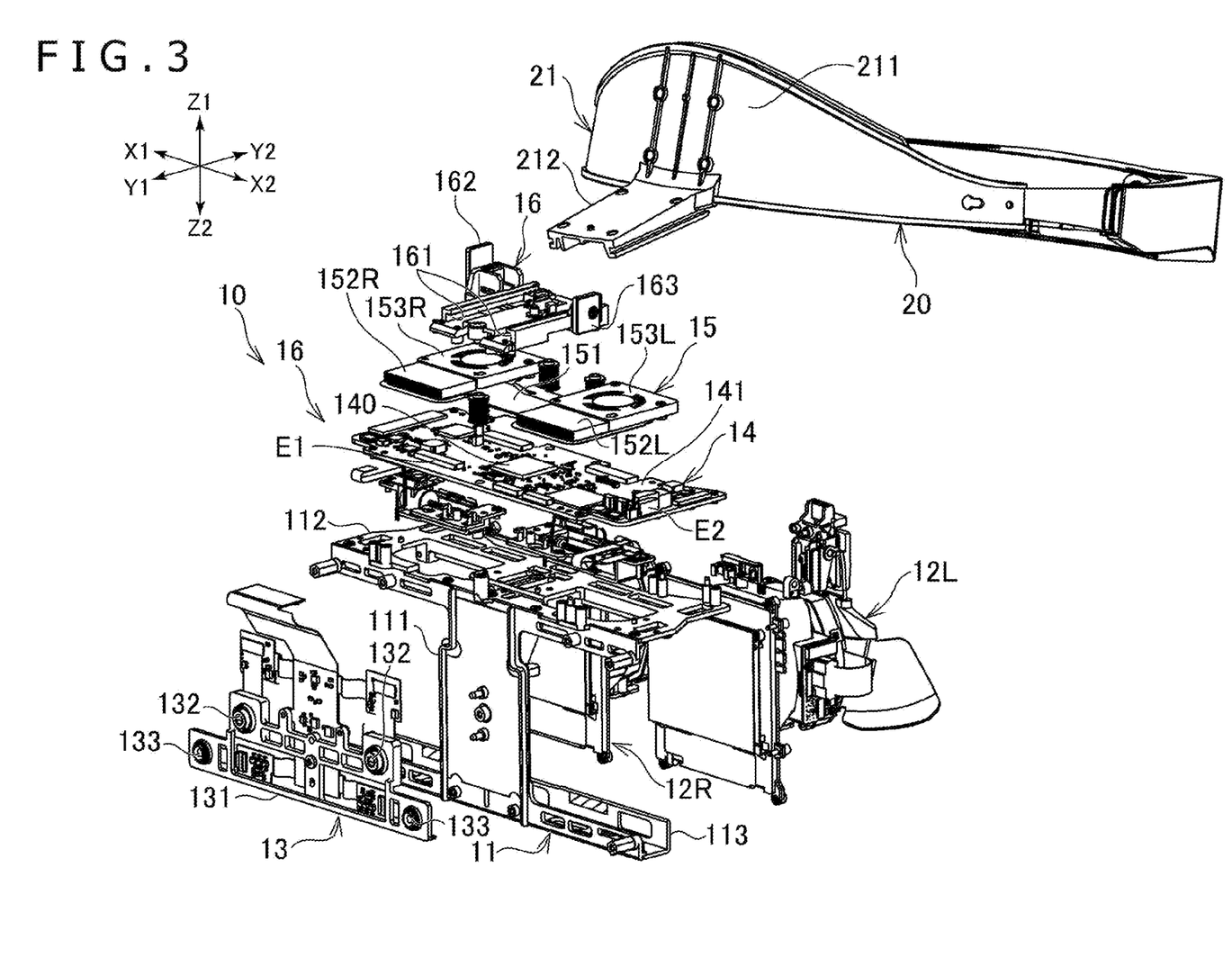
FIG. 3 is an exploded perspective view that illustrates a mounting band and the internal structure of the device main body of the present embodiment.
Figure 4:
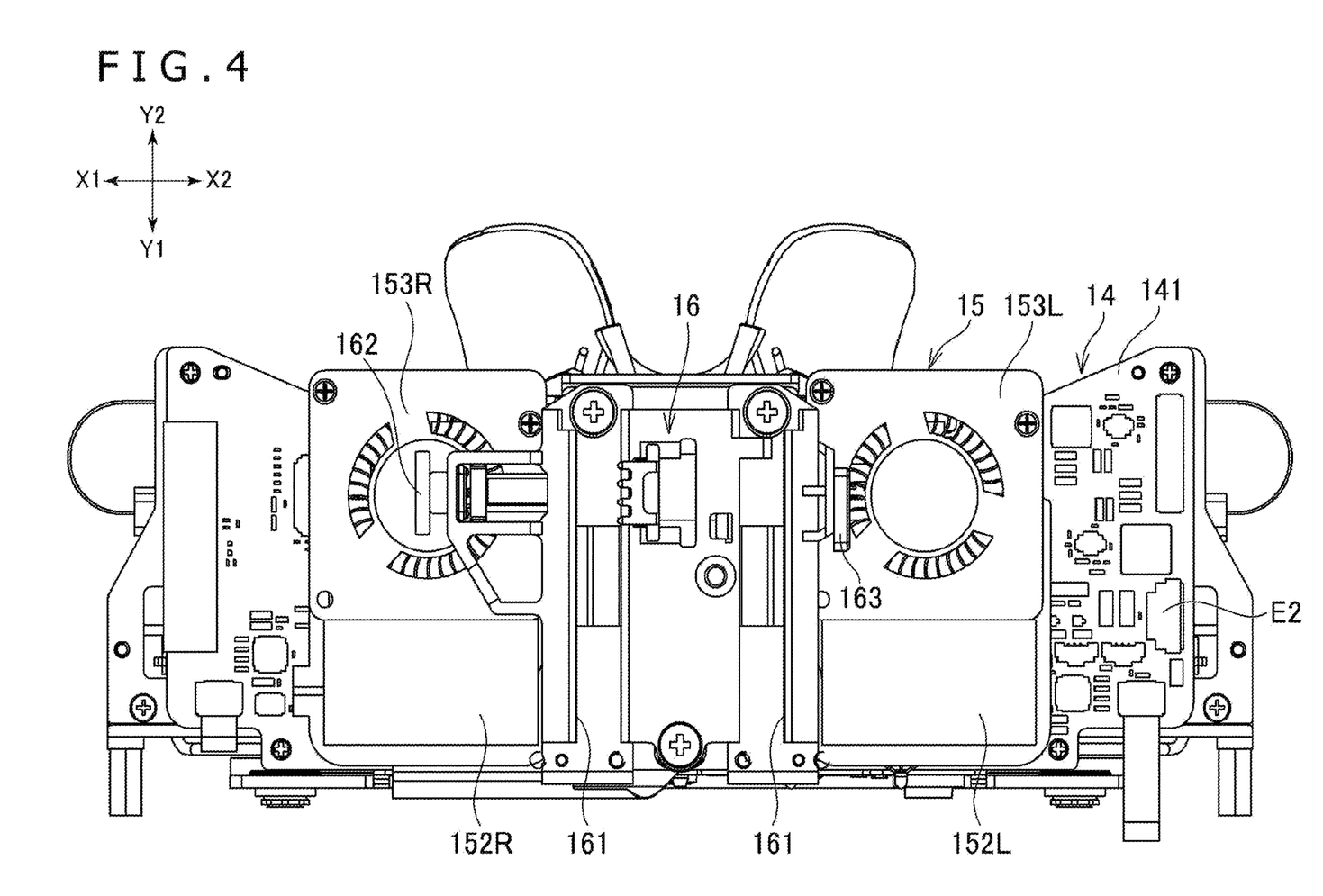
FIG. 4 is a top surface view of the internal structure of the device main body of the present embodiment, as viewed from above.
Figure 5:
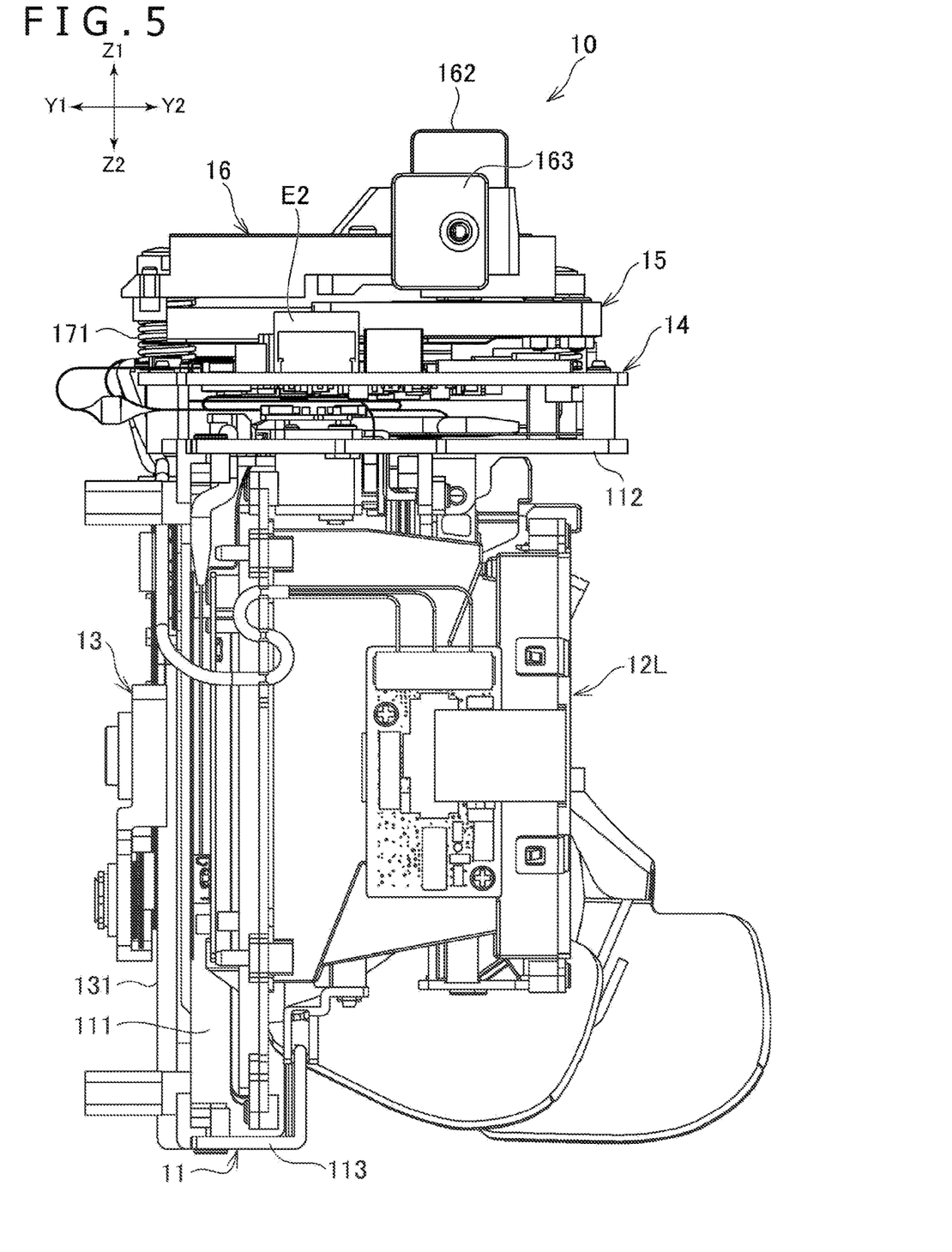
FIG. 5 is a side surface view of the internal structure of the device main body of the present embodiment, as viewed from the left.
Figure 6:
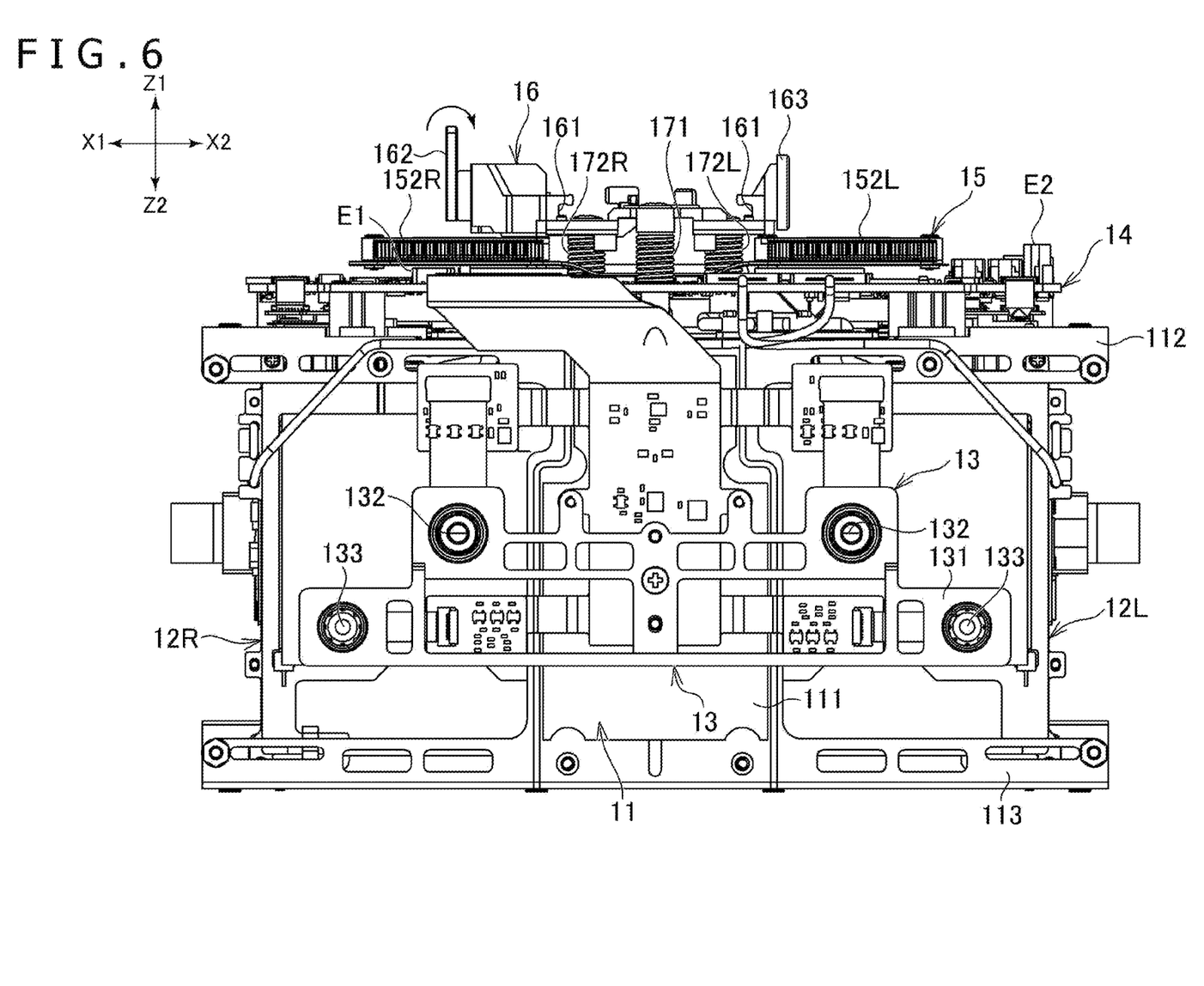
FIG. 6 is a front surface view of the internal structure of the device main body of the present embodiment, as viewed from in front.

FIG. 2 is a perspective view that illustrates the internal structure of the device main body of the present embodiment, as diagonally viewed from the front left. FIG. 3 is an exploded perspective view that illustrates the mounting band and the internal structure of the device main body of the present embodiment. FIG. 4 is a top surface view of the internal structure of the device main body of the present embodiment, as viewed from above. FIG. 5 is a side surface view that illustrates the internal structure of the device main body of the present embodiment, as viewed from the left. FIG. 6 is front surface view of the internal structure of the device main body of the present embodiment, as viewed from in front.

As illustrated in FIG. 3, the device main body 10 has a main frame 11, a right optical unit 12R, a left optical unit 12L, a camera unit 13, a circuit board 14, a cooling device 15, and the supported section 16. As illustrated in FIG. 3, in the HMD 1, the circuit board 14 is provided above the main frame 11, the cooling device 15 is provided above the circuit board 14, and the supported section 16 is provided above the cooling device 15.

The main frame 11 supports the right optical unit 12R, the left optical unit 12L, the camera unit 13, and the circuit board 14. The main frame 11 may be made from a lightweight material that has high rigidity. For example, aluminum, magnesium, or the like may be employed as the material of the main frame 11.

The main frame 11 has a middle frame 111 that extends in the up/down direction, an upper frame 112 connected to the upper portion of the middle frame 111, and a lower frame 113 connected to the lower portion of the middle frame 111.

The middle frame 111 is provided at an approximate center of the device main body 10. The widths of the upper frame 112 and the lower frame 113 in the left/right direction are greater than the width of the middle frame 111 in the left/right direction. Accordingly, as illustrated in FIG. 3 and the like, the main frame 11 has a shape like an H shape that has been tilted 90 degrees to the side, when seen from the forward/backward direction. In other words, a space is formed between the right portion of the upper frame 112 and the right portion of the lower frame 113. Similarly, a space is formed between the left portion of the upper frame 112 and the left portion of the lower frame 113. By having such a shape, it is possible to reduce the weight of the main frame 11 in comparison to a case where the shape (exterior) when seen from the forward/backward direction is made to be a rectangle.

In addition, the right optical unit 12R and the left optical unit 12L are disposed in regions formed between the middle frame 111 and the upper frame 112, and are supported by the middle frame 111, the upper frame 112, and the lower frame 113.

The right optical unit 12R has at least a lens (not illustrated) that guides image light from the display device 110 to the right eye of the user. Similarly, the left optical unit 12L has at least a lens (not illustrated) that guides image light from the display device 110 to the left eye of the user. In addition, the display device 110 illustrated in FIG. 1 may be respectively disposed in front of the lenses that the right optical unit 12R and the left optical unit 12L have. The display device 110 may be something that has a see-through type screen, and may be something that has a non-see-through type screen. In addition, the optical units 12R and 12L may have nose pads that come into contact with the user's nose.

In addition, the right optical unit 12R and the left optical unit 12L may be supported by the main frame 11 to be movable left and right. Thus, the user can, according to the interval between their own left and right eyes, adjust the interval between the lens that the right optical unit 12R is provided with and the lens that the left optical unit 12L is provided with, in the left/right direction. In addition, as described above, in the main frame 11, a space is formed between the right portion of the upper frame 112 and the right portion of the lower frame 113, and a space is formed between the left portion of the upper frame 112 and the left portion of the lower frame 113. In other words, for the right portion and left portion of the main frame 11, there is no portion that regulates movement of the right optical unit 12R and left optical unit 12L in the left/right direction. Accordingly, it is possible to have a sufficient movable range in the left/right direction for the right optical unit 12R and the left optical unit 12L.

Note that the illustrated configuration is an example, lenses and the like are not limited to things that are made into units, and, at least, it is sufficient if lenses and the like are incorporated in the device main body 10.

The camera unit 13 has at least a camera frame 131, and cameras 132 and 133 that are supported by the camera frame 131. The camera frame 131 is supported by the front portion of the middle frame 111. The cameras 132 and 133 are, for example, each provided with an image capturing element that is a CCD (Charge Coupled Device), a CMOS (Complementary Metal Oxide Semiconductor), or the like, and captures forward of the user who has mounted the HMD 1.

A plurality of the cameras 132 and 133 may be provided, and, for example, the cameras 132 and 133 may include something used for SLAM (Simultaneous localization and mapping), which makes three-dimensional recognition possible by estimating the position and orientation of the camera from a captured image. FIG. 2 and the like illustrate a configuration in which four cameras are supported by the camera frame 131. However, the number of cameras and the position of the cameras is not limited to that which is illustrated. Note that, although illustration is omitted, the housing 120 may have openings such that each of the cameras 132 and 133 are exposed.

The circuit board 14 is supported by the upper frame 112. In a top surface view, the size of the upper frame 112 may be larger than or approximately the same as the size of the circuit board 14. In other words, the upper frame 112 may be a frame that has a predetermined width in the forward/ backward direction and a predetermined width in the left/ right direction. As illustrated in FIG. 3 or the like, the upper frame 112 is connected to the upper portion of the middle frame 111 so as to protrude backward from the middle frame 111.

The circuit board 14 is mounted with at least one or more electronic components. A side of the circuit board 14 to which a later-described integrated circuit 140 is mounted is referred to below as a mounting surface 141. In the present embodiment, the circuit board 14 is supported by the upper frame 112 such that the mounting surface 141 faces upward in a state where the HMD 1 is being used.

In addition, as also illustrated in FIG. 1, the device main body 10 has the supported section 16 in the upper portion thereof. The supported section 16 is disposed above the cooling device 15.

As illustrated in FIG. 3, FIG. 4 and the like, the supported section 16 has rails 161, an operation section 162, and an operation support section 163. The rails 161 are provided extending in the forward/backward direction. The operation section 162 is disposed on the right side of the rails 161, and protrudes upward. The operation support section 163 is disposed on the left side of the rails 161, and protrudes upward. Note that, as illustrated in FIG. 6, at least the rails 161 of the supported section 16 may be disposed between a cooling fan 153R and a cooling fan 153L so as to not overlap the cooling fan 153R and the cooling fan 153L in a top surface view.

The support section 212 of the front member 21 is fitted into the rails 161 so as to be able to slide in the forward/ backward direction. The support section 212 is able to move forward and backward relative to the supported section 16. In other words, the device main body 10 is able to move forward and backward relative to the mounting band 20. Accordingly, a user can adjust the position of the device main body 10 in the forward/backward direction in a state where the HMD 1 is mounted on their head H. Thus, the user can adjust the distance between their eyes and the lenses provided in the optical units 12R and 12L (also referred to as eye relief).

In addition, relative movement for the support section 212 and the supported section 16 may be regulated by a not-illustrated regulatory mechanism. The user may thereby operate the operation section 162 to be able to switch from a state where relative movement for the support section 212 and the supported section 16 is regulated to a state where relative movement is permitted. For example, the user may press the operation section 162 leftward (refer to the arrow direction in FIG. 6) so that the regulation by the regulatory mechanism is released.

Note that detailed description of the regulatory mechanism is omitted, but, for example, it may be that the support section 212 and the supported section 16 are capable of relative movement by a rack and pinion mechanism, and the regulatory mechanism regulates the operation of the support section 212 and the supported section 16 by meshing with a rack gear or a pinion gear. The operation section 162 may cause the regulatory mechanism to operate to thereby release the meshing of the regulatory mechanism with the rack gear or the pinion gear. In addition, the operation section 162 may be configured to move to its original position (the position indicated in FIG. 3 and the like) by elastic force from an elastic member such as a spring, after receiving an operation from the user.

In addition, the device main body 10 may have the operation support section 163 to make it easier for the user to operate the operation section 162. For example, the user can pinch the operation section 162 and the operation support section 163 by an index finger and a thumb to thereby easily press the operation section 162 in the left direction.

Figure 7:
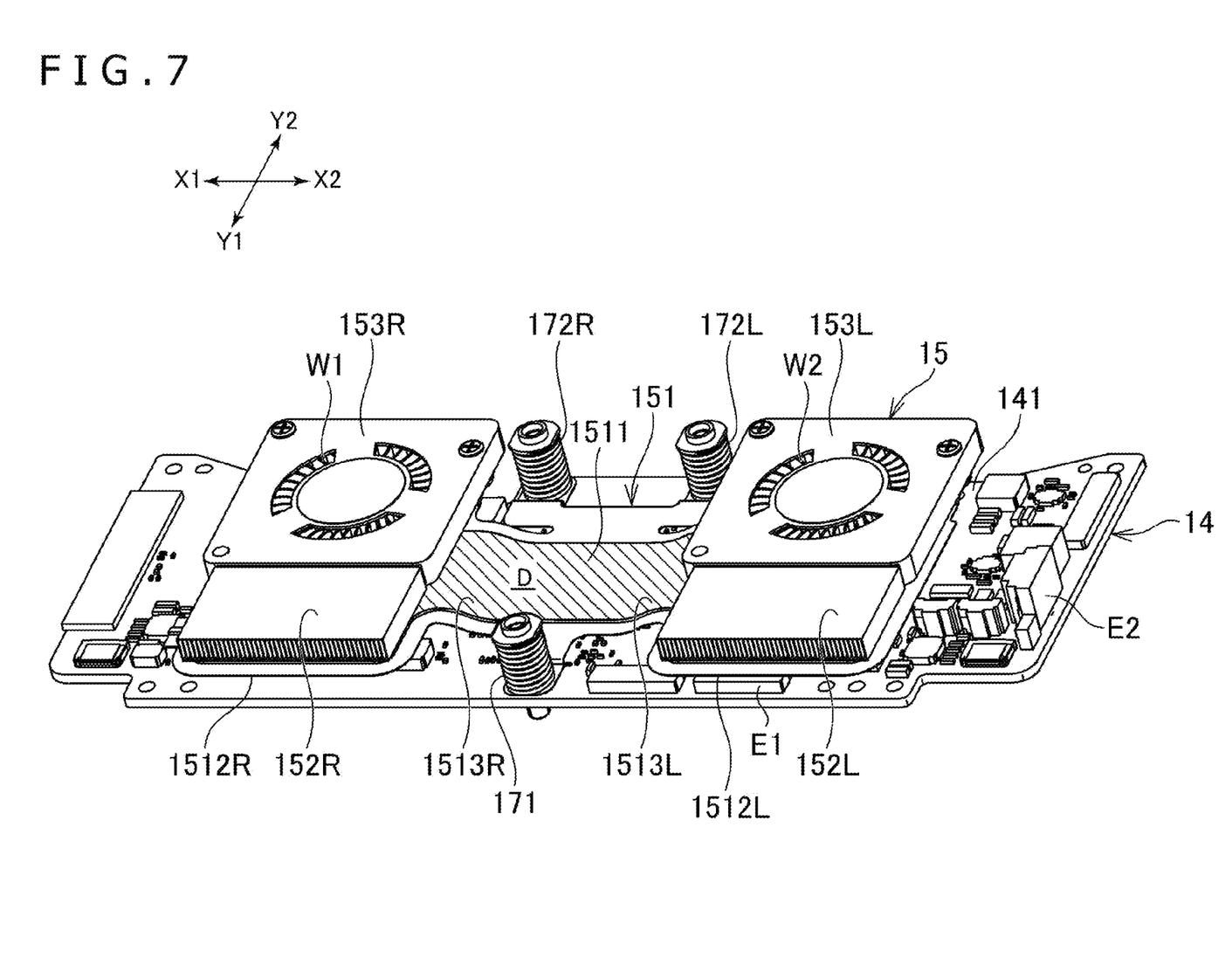
FIG. 7 is a perspective view that illustrates a cooling device and a circuit board of the present embodiment.
Figure 8:
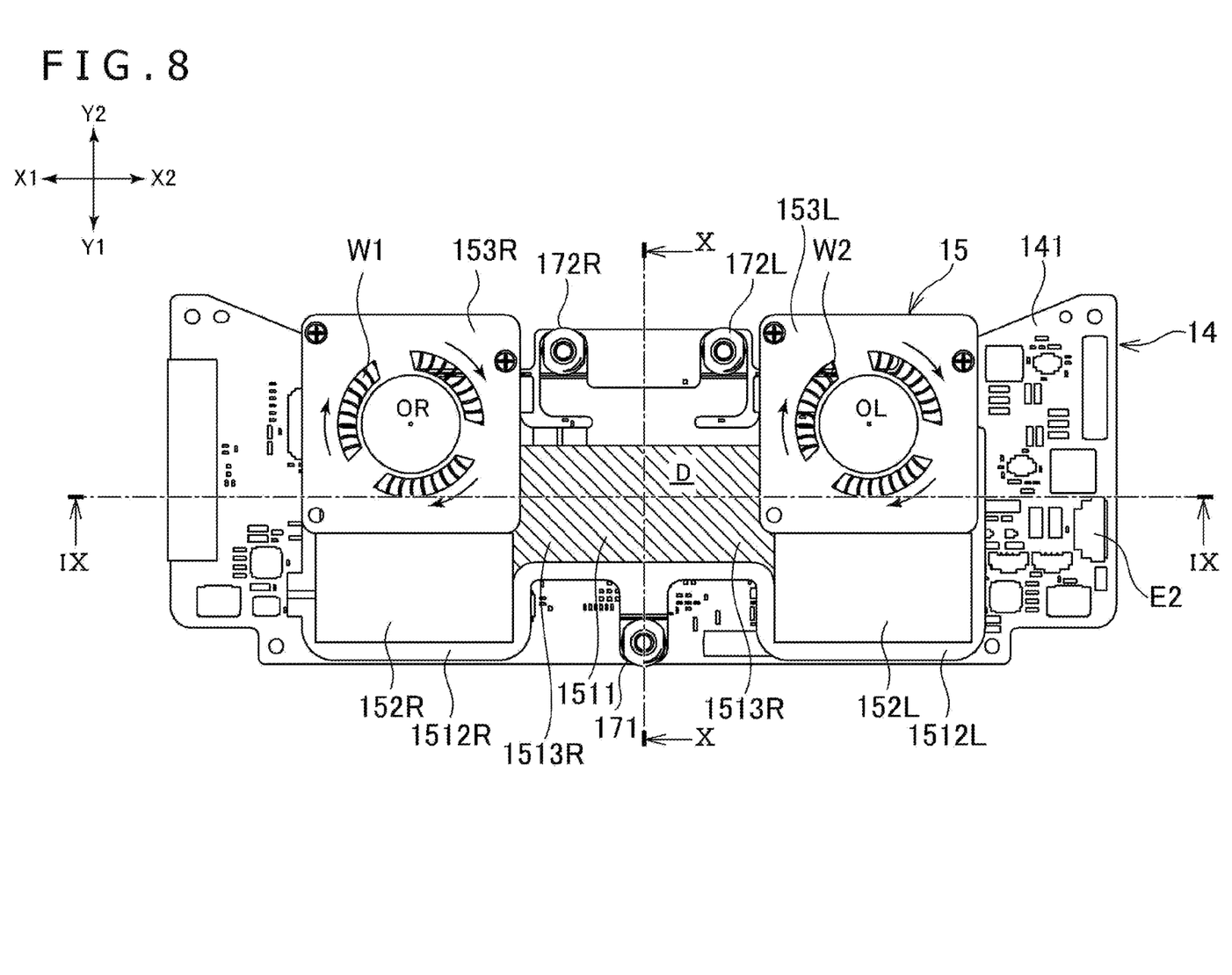
FIG. 8 is a top surface view that illustrates the cooling device and the circuit board of the present embodiment.
Figure 9:
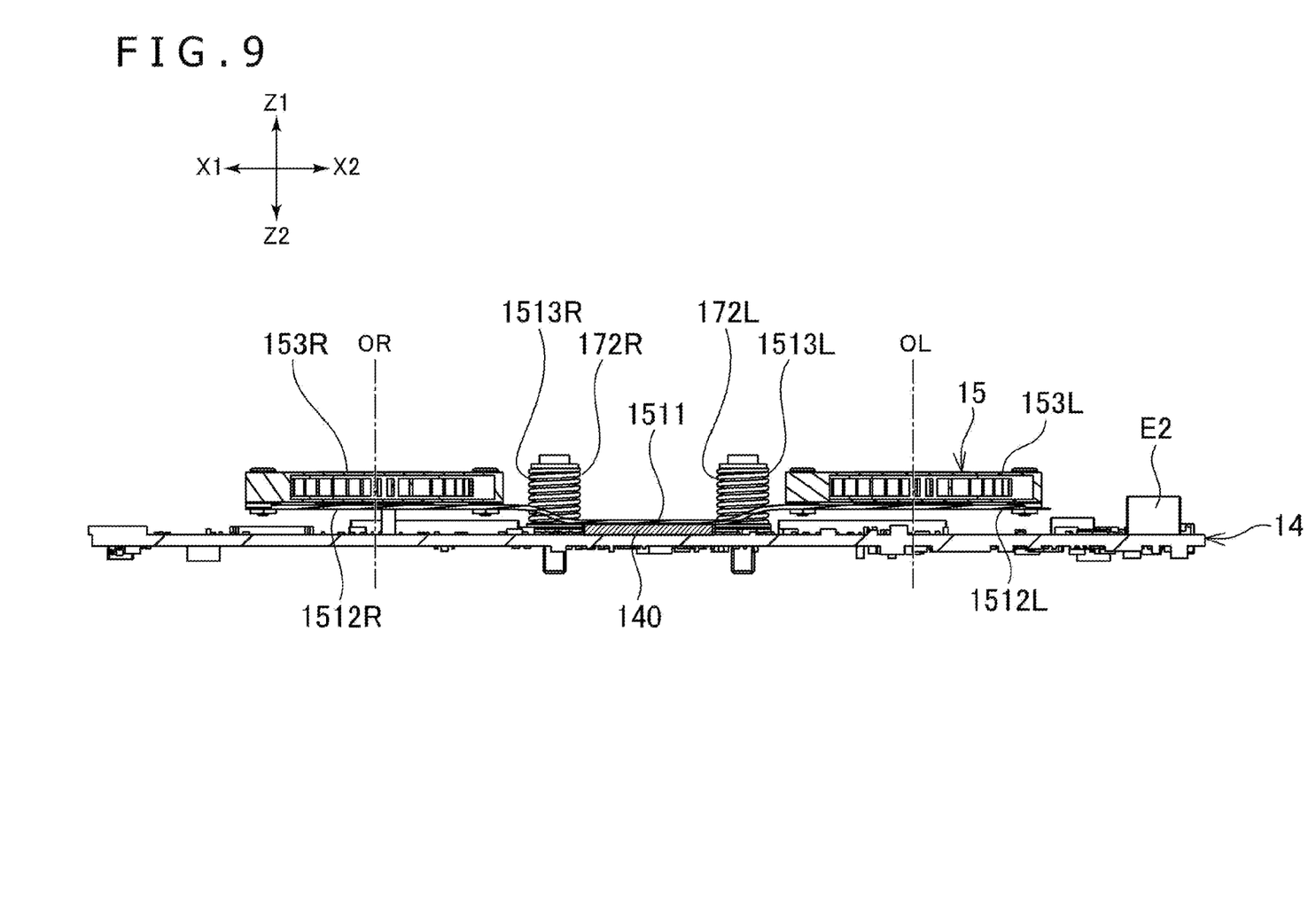
FIG. 9 is a cross-section view that illustrates a cross-section that is cut in a cutting line IX-IX of FIG. 8.
Figure 10:
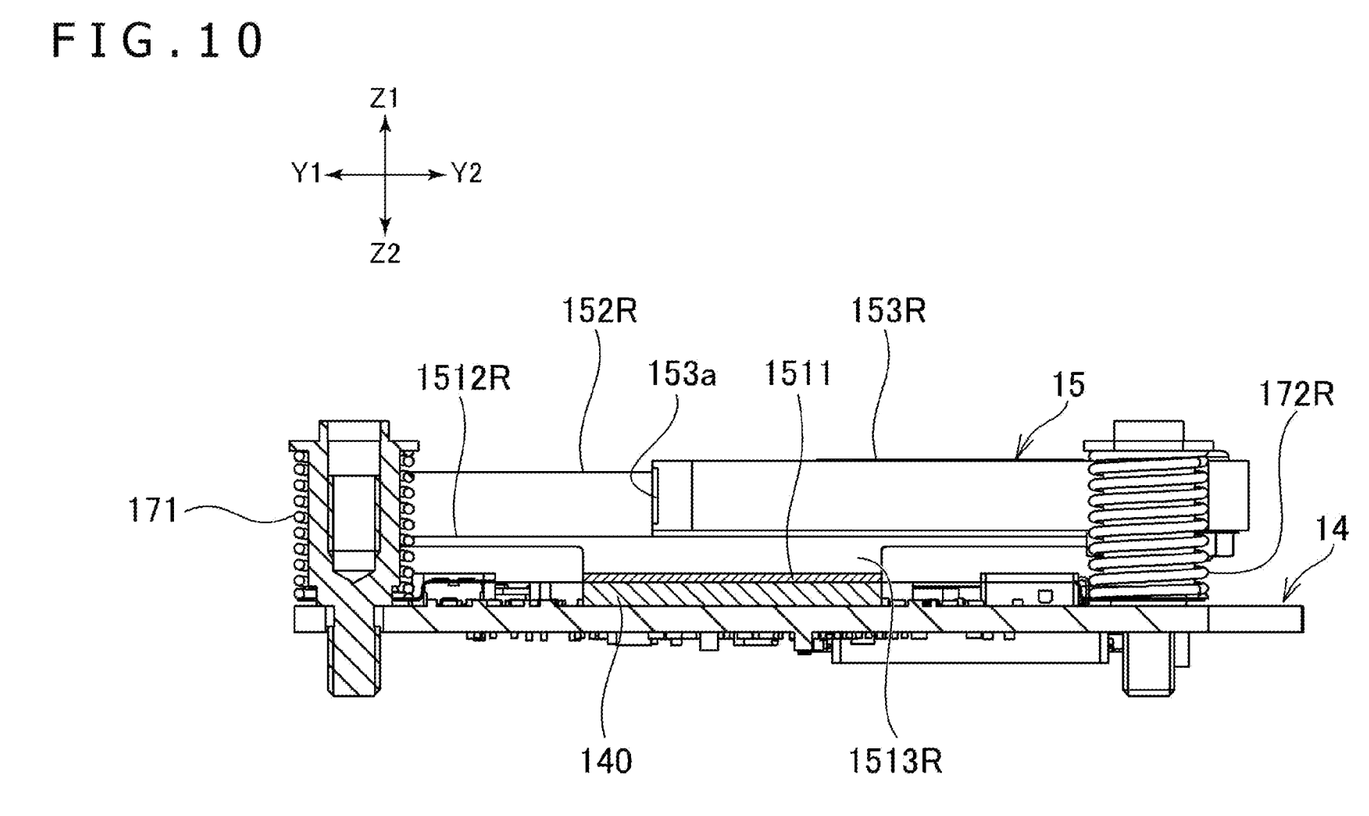
FIG. 10 is a cross-section view that illustrates a cross-section that is cut in a cutting line X-X of FIG. 8.
Figure 11:
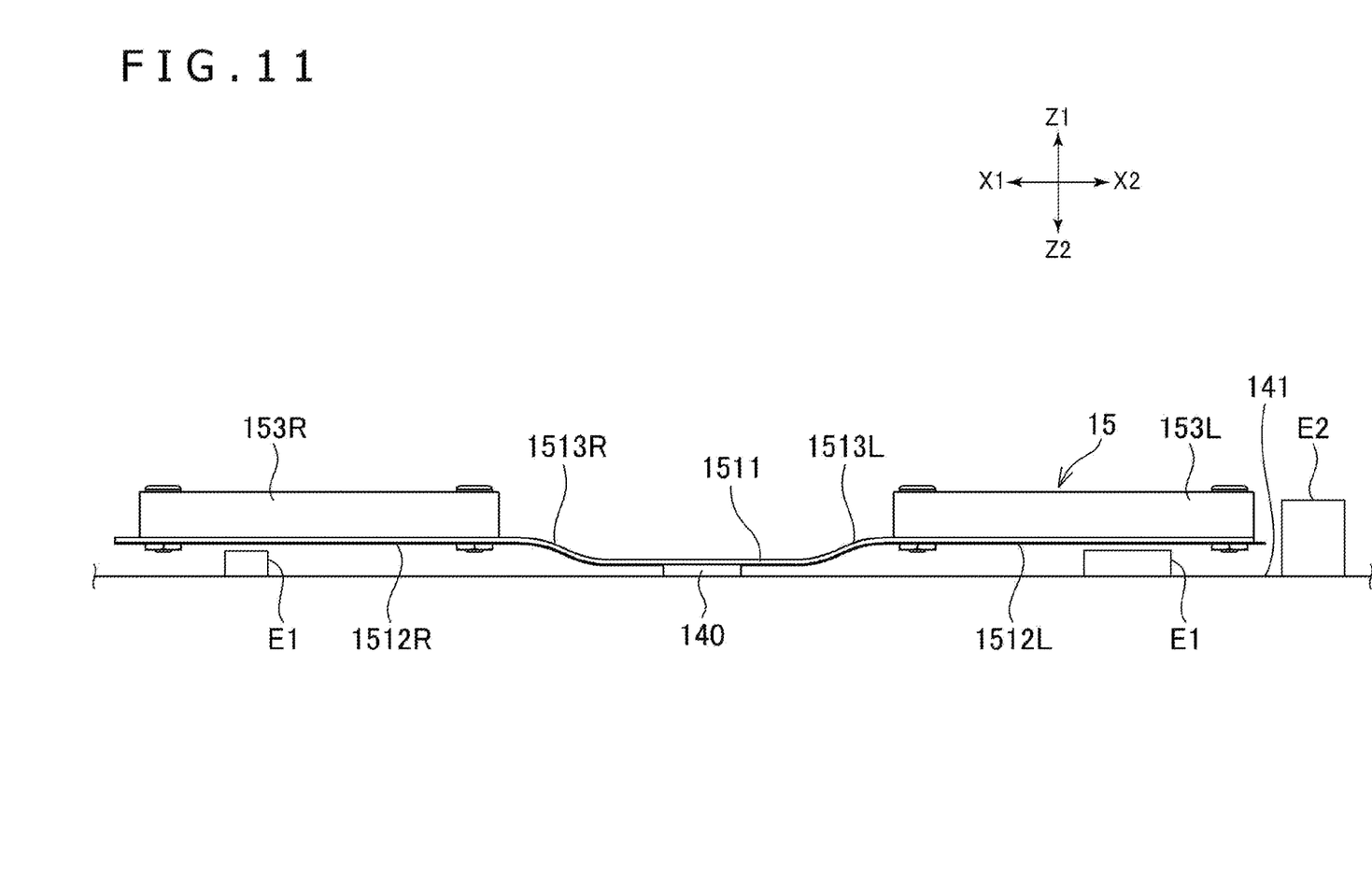
FIG. 11 is a front surface view that schematically illustrates a vapor chamber and electronic components that are mounted to the circuit board in the present embodiment.
Figure 12:
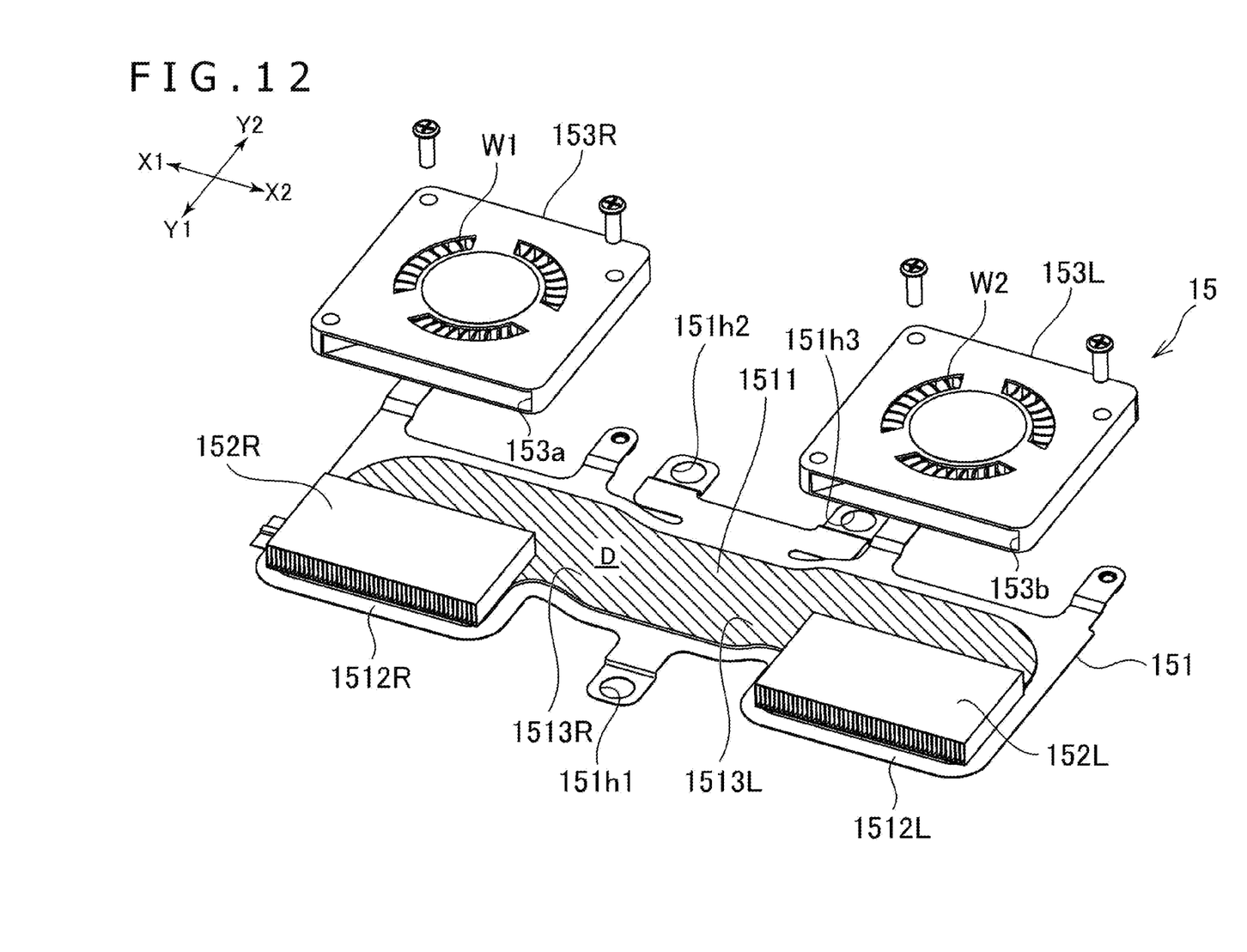
FIG. 12 is an exploded perspective view that illustrates the cooling device of the present embodiment.

Furthermore, with reference to FIG. 7 through FIG. 12, description is given regarding details of the cooling device 15 of the present embodiment. FIG. 7 is a perspective view that illustrates the cooling device and the circuit board of the present embodiment. FIG. 8 is a top surface view that illustrates the cooling device and the circuit board of the present embodiment. FIG. 9 is a cross-section view that illustrates a cross-section that is cut in a cutting line IX-IX of FIG. 8. FIG. 10 is a cross-section view that illustrates a cross-section cut in a cutting line X-X of FIG. 8. FIG. 11 is a front surface view that schematically illustrates a vapor chamber and electronic components that are mounted to the circuit board, in the present embodiment. FIG. 12 is an exploded perspective view that illustrates the cooling device of the present embodiment.

The cooling device 15 has a vapor chamber 151 which is a heat diffusion member, a right heat sink 152R, a left heat sink 152L, a right cooling fan 153R, and a left cooling fan 153L.

The cooling device 15 is disposed facing the mounting surface 141 of the circuit board 14. More specifically, the vapor chamber 151 is disposed facing the mounting surface 141.

As illustrated in FIG. 12 and the like, the vapor chamber 151 has a right mounting section 1512R to which the right heat sink 152R and the right cooling fan 153R are mounted, and a left mounting section 1512L to which the left heat sink 152L and the left cooling fan 153L are mounted.

In addition, the vapor chamber 151 has a depressed section (contact section) 1511 that is provided between the right mounting section 1512R and the left mounting section 1512L.

In addition, the vapor chamber 151 has a right connection section 1513R that connects the right mounting section 1512R and the depressed section 1511, and a left connection section 1513L that connects the left mounting section 1512L and the depressed section 1511.

As illustrated in FIG. 11, the right connection section 1513R is curved to be positioned upward in accordance with going from the depressed section 1511 side to the right mounting section 1512R side. Accordingly, the right mounting section 1512R is positioned above the depressed section 1511, and a gap is formed directly below the right connection section 1513R.

Similarly, the left connection section 1513L is curved to be positioned upward in accordance with going from the depressed section 1511 side to the left mounting section 1512L side. Accordingly, the left mounting section 1512L is positioned above the depressed section 1511, and a gap is formed directly below the left connection section 1513L.

A fluid is enclosed inside the vapor chamber 151. In the following description, a region of the vapor chamber 151 in which the fluid is enclosed therein is defined as a thermal diffusion region D. Note that, in FIG. 7, FIG. 8, and FIG. 12, a region corresponding to the thermal diffusion region D is illustrated the application of hatching. As illustrated in FIG. 12, the thermal diffusion region D is provided across the right mounting section 1512R, the right connection section 1513R, the depressed section 1511, the left connection section 1513L, and the left mounting section 1512L. Note that, although not represented in the drawings, regions directly below the heat sinks 152R and 152L are also the thermal diffusion region D.

The fluid enclosed inside the vapor chamber 151 evaporates according to a rise in temperature, and goes to an upper portion inside the vapor chamber 151. By the fluid going to the upper portion, heat dissipation is performed at the right heat sink 152R and the left heat sink 152L that are mounted on the vapor chamber 151. Subsequently, the fluid condenses, and the condensed fluid recirculates to the lower portion of the vapor chamber 151.

The right heat sink 152R and the left heat sink 152L are provided with a plurality of heat dissipation fins that extend upward from the circuit board 14 side. In other words, the right heat sink 152R and the left heat sink 152L have a configuration of upwardly dissipating heat generated by the circuit board 14.

In the present embodiment, as illustrated in FIG. 11, the depressed section 1511 is provided such that the bottom surface thereof is in direct contact with the top surface of the integrated circuit (IC: integrated circuit) 140, the bottom surface of which is mounted to the circuit board 14. By such a configuration, heat generated by the integrated circuit 140 is sent to the heat sinks 152R and 152L through the thermal diffusion region D.

Note that the integrated circuit 140 may be a CPU (Central Processing Unit) that controls the entirety of the HMD 1, for example. However, there is no limitation to this, and the integrated circuit 140 may be a circuit that, by consuming power in conjunction with being driven, can be a heat source. The greater the number of functions for the HMD 1 or the more the performance increases for the HMD 1, the more complicated information processing in the integrated circuit 140 becomes, and the higher the power consumption increases. For the integrated circuit 140, the higher the power consumption, the more heat produced.

Here, the circuit board 14 is mounted with a plurality of electronic components. The thicknesses (heights) of the plurality of electronic components vary. There needs to be, between the cooling device 15 and the circuit board 14, gaps of an extent that allows electronic components to be mounted. The depressed section 1511 of the vapor chamber 151 is directly in contact with the integrated circuit 140, as described above, in order to improve a heat dissipation effect. In other words, the distance between the bottom surface of the depressed section 1511 and the mounting surface 141 of the circuit board 14 approximately corresponds to the thickness of the integrated circuit 140.

Accordingly, it is not possible to dispose an electronic component thicker than the integrated circuit 140 between the bottom surface of the depressed section 1511 and the mounting surface 141 of the circuit board 14. Accordingly, in the present embodiment, by disposing the right mounting section 1512R and the left mounting section 1512L above the depressed section 1511 as described above, a configuration in which spaces are formed directly below the right mounting section 1512R and the left mounting section 1512L is employed. In other words, the gap between the right mounting section 1512R and the mounting surface 141 of the circuit board 14 and the gap between the left mounting section 1512L and the mounting surface 141 of the circuit board 14 are wider than the gap between the depressed section 1511 and the mounting surface 141 of the circuit board 14.

As illustrated in FIG. 11, an electronic component E1 (a first electronic component) that is thicker than the integrated circuit 140 is disposed on the mounting surface 141 directly below the right mounting section 1512R. Similarly, an electronic component E1 (a first electronic component) that is thicker than the integrated circuit 140 is disposed on the mounting surface 141 directly below the left mounting section 1512L. Note that the electronic components E1 may be disposed such that the top surface thereof is in contact with the bottom surface of the right mounting section 1512R or the left mounting section 1512L. In this case, it is possible to efficiently dissipate heat generated from the electronic components E1. In contrast, when the top surface of an electronic component E1 is not in contact with the bottom surface of the right mounting section 1512R or the left mounting section 1512L, only heat from the integrated circuit 140 is directly transmitted to the vapor chamber 151 and thus it is possible to more effectively dissipate heat generated from the integrated circuit 140.

Furthermore, an electronic component E2 (second electronic component) thicker than an electronic component disposed directly below the right mounting section 1512R or the left mounting section 1512L is disposed, as illustrated in FIG. 7 and FIG. 11, in a region of the mounting surface 141 that does not overlap with the cooling device 15 in a top surface view. In other words, a comparatively thick connector among electronic circuits mounted to the circuit board 14 may be disposed in a region of the mounting surface 141 that does not overlap with the cooling device 15 in a top surface view. In the present embodiment, a region of the mounting surface 141 that does not overlap with the cooling device 15 in a top surface view is a right portion or a left portion of the mounting surface 141. The electronic component E2 may be a connector that is connected by various kinds of electrical wiring, for example.

Note that, in FIG. 11, simplified illustration is given for only one electronic component E1 that is disposed directly below the right mounting section 1512R and one electronic component E1 that is disposed directly below the left mounting section 1512L, but a plurality of the electronic components E1 may be disposed directly below the right mounting section 1512R and directly below the left mounting section 1512L. In addition, although only one electronic component E2 is illustrated in FIG. 11, a plurality of the electronic components E2 may be disposed.

In addition, the vapor chamber 151 may be held in a state where the vapor chamber 151 is biased with respect to the circuit board 14 by the elastic force of fixing tools 171, 172R, and 172L that are provided with springs. Specifically, it may be that the fixing tools 171, 172R, and 172L are inserted into respective holes to be held 151h1, 151h2, and 151h3 illustrated in FIG. 12, and peripheral portions of the holds to be held 151h1, 151h2, and 151h3 are pressed downward by the springs that the fixing tools 171, 172R, and 172L are provided with. By such a configuration, the depressed section 1511 of the vapor chamber 151 is in elastic contact with the integrated circuit 140 that is mounted to the circuit board 14. Accordingly, the state of contact between the depressed section 1511 and the integrated circuit 140 is stable, and it is possible to more effectively transmit heat generated by the integrated circuit 140 to the vapor chamber 151.

The fixing tools 171, 172R, and 172L may be held between the circuit board 14 and the supported section 16. In other words, as illustrated in FIG. 6, the fixing tools 171, 172R, and 172L may have a function of supporting the supported section 161. In addition, as illustrated in FIG. 6, the fixing tools 171, 172R, and 172L may be disposed between the cooling fan 153R and the cooling fan 153L in the left/right direction. Thus, it is possible to have a configuration in which the circuit board 14 and the cooling device 15 are disposed in the upper portion of the device main body 10, and the supported section 161 is disposed in the upper portion and the center of the device main body 10.

By making the vapor chamber 151 have the configuration as described above, it is possible to efficiently dissipate heat from the integrated circuit 140 and mount a plurality of electronic components to the circuit board 14 without enlarging the mounting surface 141 of the circuit board 14.

In addition, the right heat sink 152R and the right cooling fan 153R are mounted on the right mounting section 1512R of the vapor chamber 151. The right heat sink 152R and the right cooling fan 153R are provided adjacent to each other in the forward/backward direction.

Similarly, the left heat sink 152L and the left cooling fan 153L are mounted on the left mounting section 1512L of the vapor chamber 151. The left heat sink 152L and the left cooling fan 153L are provided adjacent to each other in the forward/backward direction.

The right cooling fan 153R has vanes W1 that rotate around a central axis OR (refer to FIG. 8 and FIG. 9) that extends through the circuit board 14. Similarly, the left cooling fan 153L has vanes W2 that rotate around a central axis OL (refer to FIG. 8 and FIG. 9) that extends through the circuit board 14.

In addition, an air blow port 153a, which opens facing the right heat sink 152R, is formed in a housing of the right cooling fan 153R as illustrated in FIG. 12. Similarly, an air blow port 153b, which opens facing the left heat sink 152L, is formed in a housing of the left cooling fan 153L.

By rotationally driving the vanes W1 of the right cooling fan 153R, cooling air which is sent through the air blow port 153a toward the heat sink 152R is generated. Similarly, by rotationally driving the vanes W2 of the left cooling fan 153L, cooling air is sent through the air blow port 153b toward the heat sink 152L. By such a configuration, the cooling performance for the cooling device 15 improves further. Note that the direction in which cooling air generated by the cooling fans 153R and 153L is blown is not limited to that described here. For example, the cooling fans 153R and 153L may blow cooling air toward the circuit board 14. Alternatively, there may be a configuration in which enclosed air is sucked in from below the cooling fans 153R and 152L and sent out upwards.

By the HMD 1 described above having the cooling device 15, even when heat is generated by an electronic component mounted to the circuit board 14, an excessive rise in temperature is suppressed. As a result, it is possible to suppress, for example, the HMD 1 malfunctioning or a stoppage of driving for the HMD 1. In particular, the configuration described in the present embodiment is effective for an HMD 1 that has high power consumption for electronic components due to increasing the number of functions or increasing performance. Specifically, the configuration described in the present embodiment is effective for, for example, an HMD 1 that employs a wireless communication technology which has high power consumption.

When the circuit board 14 and the cooling device 15 which have weight of a certain level are disposed in the front portion of the device main body 10 at positions far from the head H of the user who mounted the HMD 1, the center of gravity of the device main body 10 will be positioned forward. In particular, in a configuration that has a camera for capturing forward of the HMD 1 as described in the present embodiment, when the circuit board 14 and the cooling device 15 are disposed in the front portion of the device main body 10, the camera unit 13 is disposed further in front of the circuit board 14 and the cooling device 15.

As a result, the load applied to the user who is mounted with the HMD 1 increases, and it becomes more likely that the HMD 1 will slip off from the head H of the user. Accordingly, a need to take a countermeasure such as firmly fixing the mounting band 20 to the head H of the user arises so that the HMD 1 does not slip off. By the circuit board 14 and the cooling device 15 being disposed in the upper portion of the device main body 10 in the HMD 1 of the present embodiment, in comparison to a configuration in which the circuit board 14 and the cooling device 15 are mounted in a front portion of the device main body 10, the load applied to the user who mounts the HMD 1 is suppressed, and it is possible to suppress the HMD 1 from slipping off the head H of the user.

Note that the configuration of the HMD 1 described in the embodiment described above is an example, and it is sufficient if at least the circuit board 14 and the cooling device 15 are disposed in the upper portion of the device main body 10. For example, the configuration and the like of the optical units 12R and 12L and the main frame 11 is not limited to that which is illustrated.

In addition, description has been given in the present embodiment regarding an example in which the cooling device 15 has the vapor chamber 151, the heat sinks 152R and 152L, and the cooling fans 153R and 153L, but there is no limitation to this, and it is sufficient if the cooling device 15 has at least a cooling effect with respect to heat generated at the circuit board 14. In other words, the cooling device 15 may have only one of a vapor chamber, a heat sink, and a cooling fan, and may be provided with a different cooling structure. The different cooling structure may have a heat pipe, for example.

In addition, description has been given in the present embodiment regarding an example in which the cooling device 15 has two each of a heat sink and a cooling fan, but there is no limitation to this. For example, it may be that the support section 212 is formed on each of a right portion and a left portion on the mounting band 20, and one heat sink and one cooling fan is provided between these two support sections 212.

In addition, in the present embodiment, description has been given for a configuration in which the mounting band 20 is provided with the front member 21 and the mounting band 20 is connected to the device main body 10 via the front member 21, but there is no limitation to this. For example, there may be a configuration in which a band portion of the mounting band 20 that extends backward is directly connected to the device main body 10.

REFERENCE SIGNS LIST

1: Head-mounted display (HMD)
10: Device main body
14: Circuit board
15: Cooling device
20: Mounting band

The invention claimed is:
1. A head-mounted display comprising:
a device main body;
a mounting band that supports the device main body and is mounted on a head of a user;
a circuit board that is disposed in an upper portion of the device main body and has a mounting surface on which one or more electronic components are mounted; and a cooling device that is disposed facing the mounting surface in the upper portion of the device main body, wherein:

the device main body incorporates a display device and a lens that guides image light from the display device to an eye of the user, and the circuit board and the cooling device are disposed above the lens.

2. The head-mounted display according to claim 1, wherein the device main body incorporates a display device, and the circuit board and the cooling device are disposed above the display device.

3. The head-mounted display according to claim 1, wherein the circuit board is disposed such that the mounting surface faces upward.

4. The head-mounted display according to claim 1, wherein the cooling device includes a heat dissipation fin.

5. The head-mounted display according to claim 4, wherein a plurality of the heat dissipation fins are provided in alignment with a predetermined direction, and extend upward from a side on which the circuit board is provided.

6. The head-mounted display according to claim 1, wherein the device main body has, in a front portion of the device main body, a camera unit that includes a camera and a frame that supports the camera.

7. A head-mounted display, comprising:

a device main body;

a mounting band that supports the device main body and is mounted on a head of a user;

a circuit board that is disposed in an upper portion of the device main body and has a mounting surface on which one or more electronic components are mounted; and a cooling device that is disposed facing the mounting surface in the upper portion of the device main body, wherein:

the device main body has a supported section that is supported by the mounting band, and at least a portion of the supported section is disposed above the cooling device.

8. The head-mounted display according to claim 7, wherein the supported section is supported by the mounting band so as to be able to move relative to the mounting band in a forward/backward direction.

9. The head-mounted display according to claim 8, comprising: an operation section, at least a portion of which is provided above the cooling device, that, in accordance with receiving an operation from a user, releases regulation of movement by the supported section relative to the mounting band.

10. The head-mounted display according to claim 7, wherein the cooling device includes a cooling fan that generates cooling air.

11. The head-mounted display according to claim 10, wherein the cooling fan is respectively disposed on both of the left and right sides of the supported section.

12. The head-mounted display according to claim 10, wherein the cooling fan has a vane that rotates around a central axis, and a direction in which the central axis extends penetrates the circuit board.

13. A head-mounted display, comprising:

a device main body;

a mounting band that supports the device main body and is mounted on a head of a user;

a circuit board that is disposed in an upper portion of the device main body and has a mounting surface on which one or more electronic components are mounted; and a cooling device that is disposed facing the mounting surface in the upper portion of the device main body, wherein:

the circuit board is mounted with an integrated circuit as the electronic component, and the cooling device includes a heat diffusion member that is in contact with the integrated circuit and diffuses heat generated from the integrated circuit.

14. The head-mounted display according to claim 13, wherein a fluid that evaporates or condenses in accordance with temperature is enclosed inside the heat diffusion member.

15. The head-mounted display according to claim 13, wherein the heat diffusion member includes a mounting section to which at least a heat dissipation fin is mounted.

16. The head-mounted display according to claim 15, wherein the heat diffusion member includes a connection section that connects the mounting section and a contact section that is in contact with the integrated circuit such that the mounting section is disposed above the contact section.

17. The head-mounted display according to claim 15, wherein the one or more electronic components includes a first electronic component that is mounted on the mounting surface directly below the mounting section and is thicker than the integrated circuit.

18. The head-mounted display according to claim 17, wherein the one or more electronic components includes a second electronic component that is disposed so as to not overlap the cooling device in a top surface view and is thicker than the first electronic component.

19. The head-mounted display according to claim 13, comprising: an elastic member that causes the heat diffusion member to elastically be in contact with the integrated circuit.

* * * * *